US007550672B2

(12) United States Patent
Chadbourne et al.

(10) Patent No.: US 7,550,672 B2
(45) Date of Patent: Jun. 23, 2009

(54) ELECTRICAL CONNECTOR AND CONDUCTOR ASSEMBLY COVER

(75) Inventors: Christopher G. Chadbourne, Nashua, NH (US); Thomas R. Faucher, Manchester, NH (US); David J. Shibilia, Londonderry, NH (US); Thomas Nelson, Kennebunk, ME (US); Gerhard Schwebler, Kennebunk, ME (US)

(73) Assignee: FCI Americas Technology, Inc., Carson City, NV (US)

( * ) Notice: Subject to any disclaimer, the term of this patent is extended or adjusted under 35 U.S.C. 154(b) by 80 days.

(21) Appl. No.: 11/507,889

(22) Filed: Aug. 21, 2006

(65) Prior Publication Data

US 2007/0051532 A1 Mar. 8, 2007

Related U.S. Application Data

(60) Provisional application No. 60/714,878, filed on Sep. 6, 2005, provisional application No. 60/772,225, filed on Feb. 10, 2006.

(51) Int. Cl.
*H02G 3/06* (2006.01)

(52) U.S. Cl. ....................... 174/92; 174/138 F; 174/76; 174/88 R; 174/59; 439/367; 439/467; 439/413

(58) Field of Classification Search ................... 174/92, 174/138 F, 76, 88 R, 59; 439/367, 467, 456, 439/687, 413, 794
See application file for complete search history.

(56) References Cited

U.S. PATENT DOCUMENTS

| | | | | |
|---|---|---|---|---|
| 3,183,302 A | | 5/1965 | Wochner et al. | 174/138 |
| 3,278,674 A | | 10/1966 | Matthysse et al. | 174/138 |
| 3,879,574 A | | 4/1975 | Filreis et al. | 174/76 |
| 3,912,855 A | * | 10/1975 | Thompson et al. | 174/93 |
| 4,029,895 A | | 6/1977 | Scarborough | 174/138 F |
| 4,217,022 A | * | 8/1980 | Carre | 439/404 |
| 4,426,413 A | | 1/1984 | Fentress | 428/36 |
| 4,787,697 A | | 11/1988 | Alrutz et al. | 350/96.2 |
| 5,173,573 A | | 12/1992 | Jervis | 174/138 F |
| 5,561,269 A | | 10/1996 | Robertson et al. | 174/92 |
| 5,684,274 A | * | 11/1997 | McLeod | 174/92 |
| 5,763,835 A | | 6/1998 | Huynh-Ba et al. | 174/92 |
| 5,828,005 A | | 10/1998 | Huynh-Ba et al. | 174/92 |
| 6,055,115 A | * | 4/2000 | Davis | 359/800 |
| 6,280,235 B1 | | 8/2001 | Radliff | 439/467 |
| 7,012,194 B1 | * | 3/2006 | Wang | 174/92 |
| 7,139,136 B2 | * | 11/2006 | Waggoner et al. | 359/803 |
| 2004/0219820 A1 | | 11/2004 | Sokol et al. | 439/369 |
| 2006/0011372 A1 | | 1/2006 | Rodigues et al. | 174/92 |

FOREIGN PATENT DOCUMENTS

| | | | |
|---|---|---|---|
| GB | 2326620 | * | 12/1998 |

* cited by examiner

*Primary Examiner*—Dhiru R Patel
(74) *Attorney, Agent, or Firm*—Harrington & Smith, PC

(57) ABSTRACT

An electrical connector and conductor assembly cover is provided including a main housing section and a magnifying window section. The main housing section forms a connector receiving area. The connector receiving area is sized and shaped to house an electrical connector therein. The magnifying window section in the main housing section is located between the connector receiving area and an exterior of the cover such that a user can view a magnified image of a marking on the electrical connector in the connector receiving area from the exterior of the cover without opening the main housing section.

19 Claims, 7 Drawing Sheets

ELECTRICAL CONNECTOR AND CONDUCTOR ASSEMBLY COVER

CROSS REFERENCE TO RELATED APPLICATIONS

This application claims priority under 35 U.S.C. §119(e) on provisional patent application No. 60/714,878 filed Sep. 6, 2005 and provisional patent application No. 60/772,225 filed Feb. 10, 2006, which are hereby incorporated by reference in their entireties.

BACKGROUND OF THE INVENTION

1. Field of the Invention

The invention relates to a cover for an electrical connector and, more particularly, to a cover having improved features.

2. Brief Description of Prior Developments

Many electrical connection manufacturers fabricate plastic covers that are placed over electrical connectors in order to shield them from brush contact from other wires, equipment, and workers' hands. Historically these covers have been manufactured from HDPE or PP resins in order that they may have flame retardance and flexibility, which allows the connectors to be used in telecommunications environments requiring UL 94 flame resistance ratings as well as flexibility in the fingers that are used in the conductor/cover transition area.

One of the key installation issues in installed connectors used in applications requiring these covers is the use of a 'die index'. This 'die index' is an 'embossment' on the surface of the connector that corresponds to a certain crimp die design, and the crimp die contains an embossed digit or digits on it's crimping surface. When used to crimp a connector, the connector material forms into this embossment when being displaced over the conductors or 'crimped'. This die embossment is a very important aspect of the connection, because it confirms with future inspectors of the connection that the correct die was, in fact, used to terminate the given connection.

Further, recent industry trends have resulted in the steady change from polypropylene and polyethylene to polycarbonate, especially for the telecommunications market. Manufacturers such as T&B and PANDUIT have recently developed covers, which are clear and allow the user to see the connection that it is protecting. This has been a very interesting and well-received development in the marketplace, as these covers provide the perceived ability to better understand and inspect the integrity of the connections. PANDUIT has recently introduced a polycarbonate cover with flexible polypropylene fingers at both ends of the cover.

Unfortunately these clear covers lack two very important aspects: the ability to see the die index close-up, and the ability of the covers to have conductor/cover interface fingers that are flexible enough to prevent them from breaking and to prevent them from damaging the conductor insulation when installed.

In addition, one of the key installation aspects of these connector covers is that they be installed onto connectors, then 'pulled' into place in a wire trough or cable tray prior to being attached to power equipment. This 'pulling' action can be detrimental to the integrity of the connector cover by causing the cover to get caught on the equipment or the cable tray, causing potential damage. Lastly, there exists a need in these covers to be able to provide a 'redundant' mechanism to prevent the cover from opening, should the latches for some reason come undone during the pulling process. The need is compounded by the fact that any external means of achieving the secondary latching must be robust and unable to be easily slipped off of the cover during its useful life.

SUMMARY OF THE INVENTION

In accordance with one aspect of the invention, an electrical connector and conductor assembly cover is provided comprising a main housing section and a magnifying window section. The main housing section forms a connector receiving area. The connector receiving area is sized and shaped to house an electrical connector therein. The magnifying window section in the main housing section is located between the connector receiving area and an exterior of the cover such that a user can view a magnified image of a marking on the electrical connector in the connector receiving area from the exterior of the cover without opening the main housing section.

In accordance with another aspect of the invention, an electrical connector and conductor assembly cover is provided comprising a main housing section and a first end section. The main housing section forms a connector receiving area which is sized and shaped to house an electrical connector therein. The first end section is at a first end of the main housing section and comprises a plurality of deflectable fingers forming an entrance into the connector receiving area through the first end section. A plurality of grooves are provided between the fingers. The grooves have different lengths.

In accordance with another aspect of the invention, an electrical connector and conductor assembly cover is provided comprising a first housing member and a second housing member. The first housing member comprises a first partially tubular section and end sections at opposite ends of the first partially tubular section. The first partially tubular section comprises a first side section with a recess along an exterior side of the first side section. The second housing member comprises a second partially tubular section and end sections at opposite ends of the second partially tubular section. The second partially tubular section comprises a second side section with a recess along an exterior side of the second side section. The first and second housing members are sized and shaped to be connected to each other to form a generally tubular shape with the recesses of the first and second side sections being located at opposite exterior sides of the generally tubular section.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
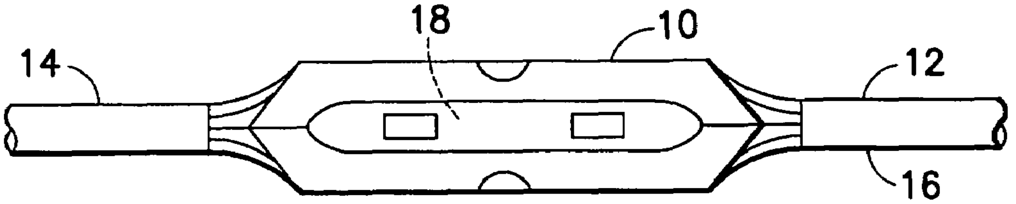
FIG. 1 is a side view of an electrical connector and conductor assembly cover shown attached to an electrical connector and conductor assembly.

Referring to FIG. 1, there is shown a side view of an electrical connector and conductor assembly cover 10 incorporating features of the invention shown attached to an electrical connector and conductor assembly 12. Although the invention will be described with reference to the exemplary embodiments shown in the drawings, it should be understood that the invention can be embodied in many alternate forms of embodiments. In addition, any suitable size, shape or type of elements or materials could be used.

The assembly 12 generally comprises two electrical conductors 14, 16, such as a main and a tap, connected to each other by an electrical connector 18. The connector 18 connects the two conductors 14, 16 to each other. In a preferred embodiment, the connector 18 is crimped onto ends of the conductors. However, any suitable connection method could be provided. During the crimping process, the connector is preferably deformed to include creation of a marking thereon to indicate the type of crimping dies used to create the crimp.

Figure 2:
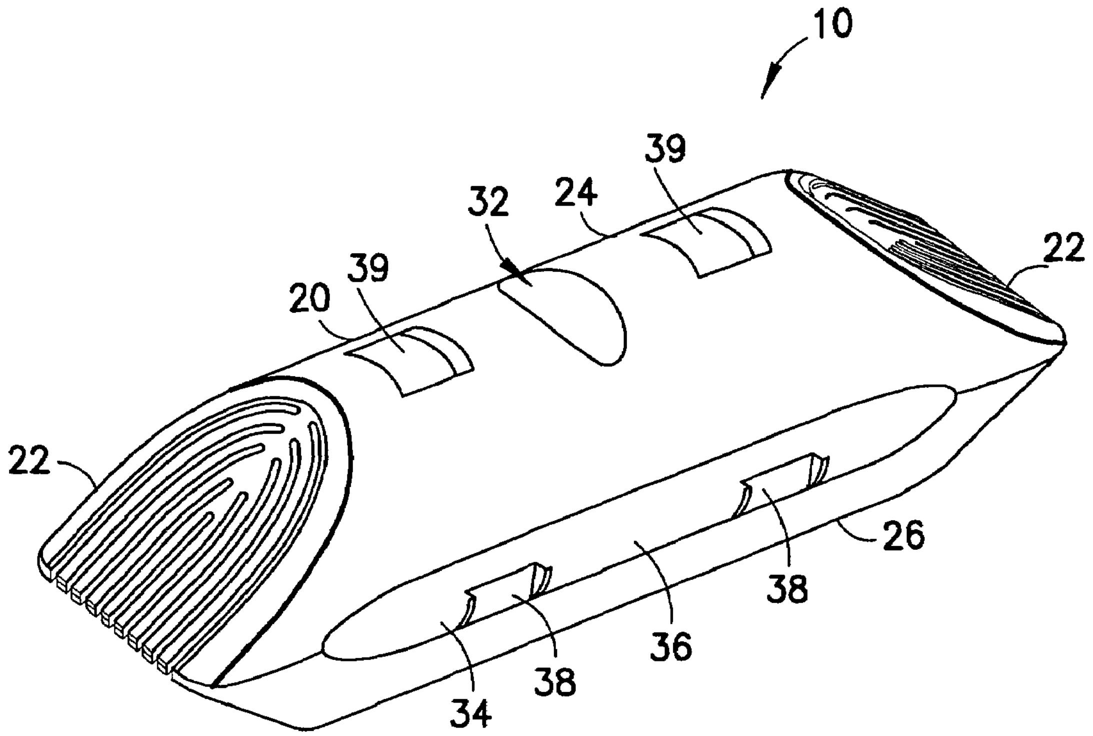
FIG. 2 is a perspective view of the cover shown in FIG. 1 before attachment to the electrical connector and conductor assembly.
Figure 3:
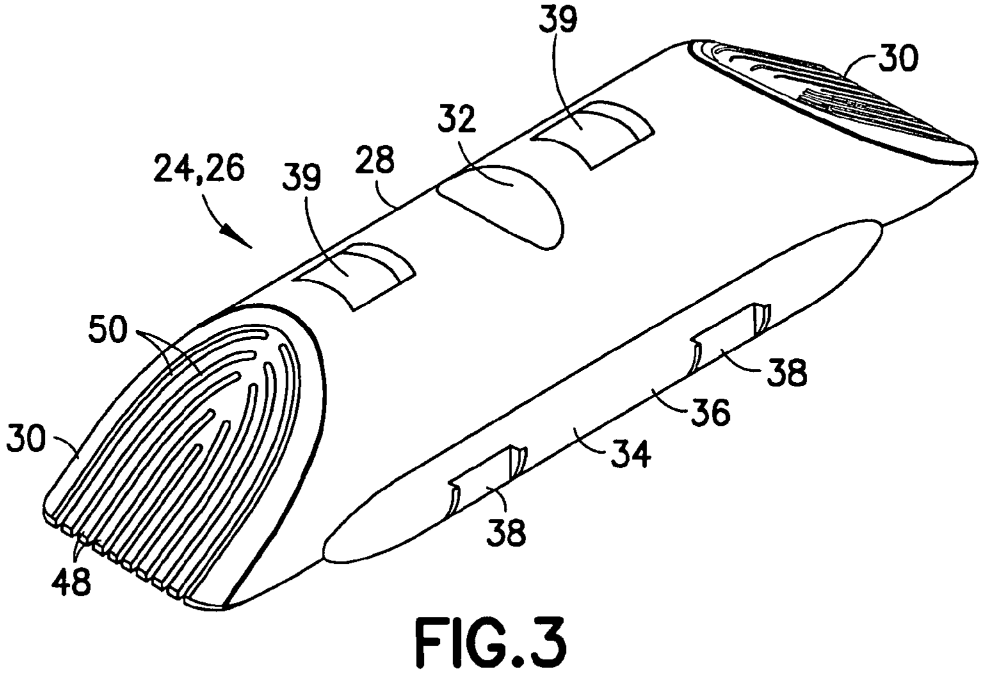
FIG. 3 is a perspective view of one of the cover members of the cover shown in FIG. 2.
Figure 4:
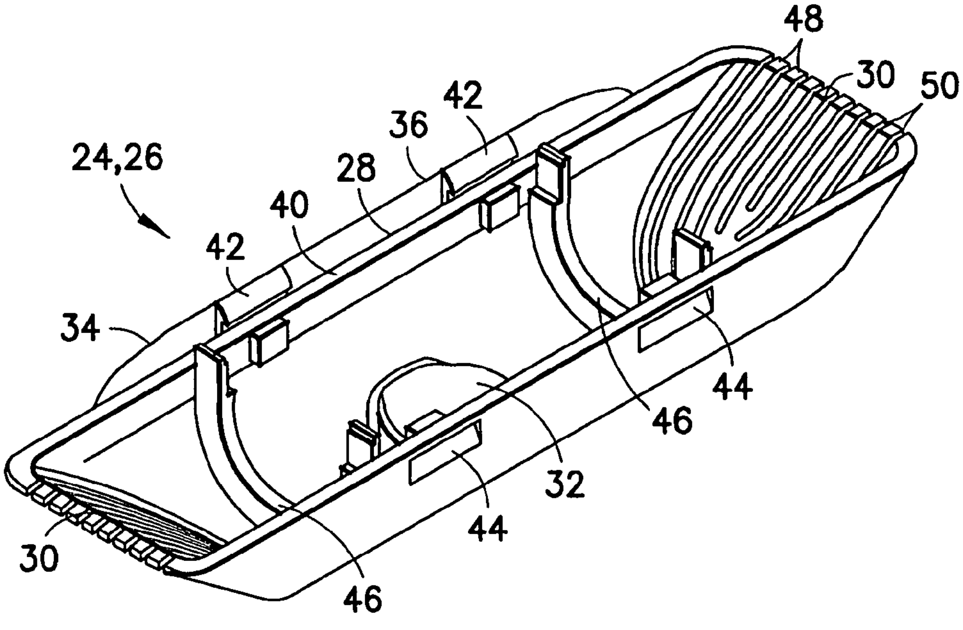
FIG. 4 is a perspective view of the cover member shown in FIG. 3 from an opposite direction.
Figure 5:
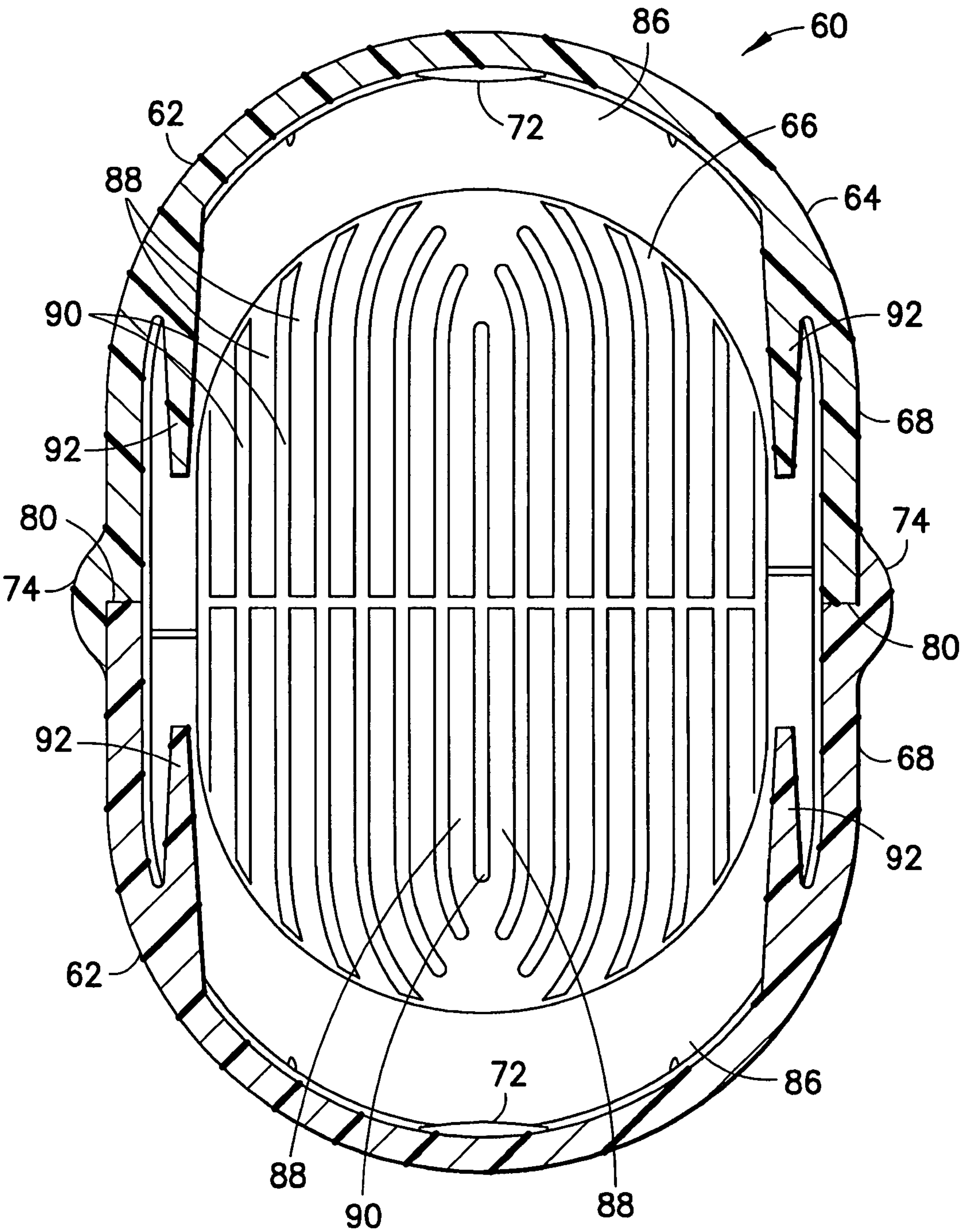
FIG. 5 is cross sectional view of an alternate embodiment of the cover shown in FIG. 2.
Figure 6:
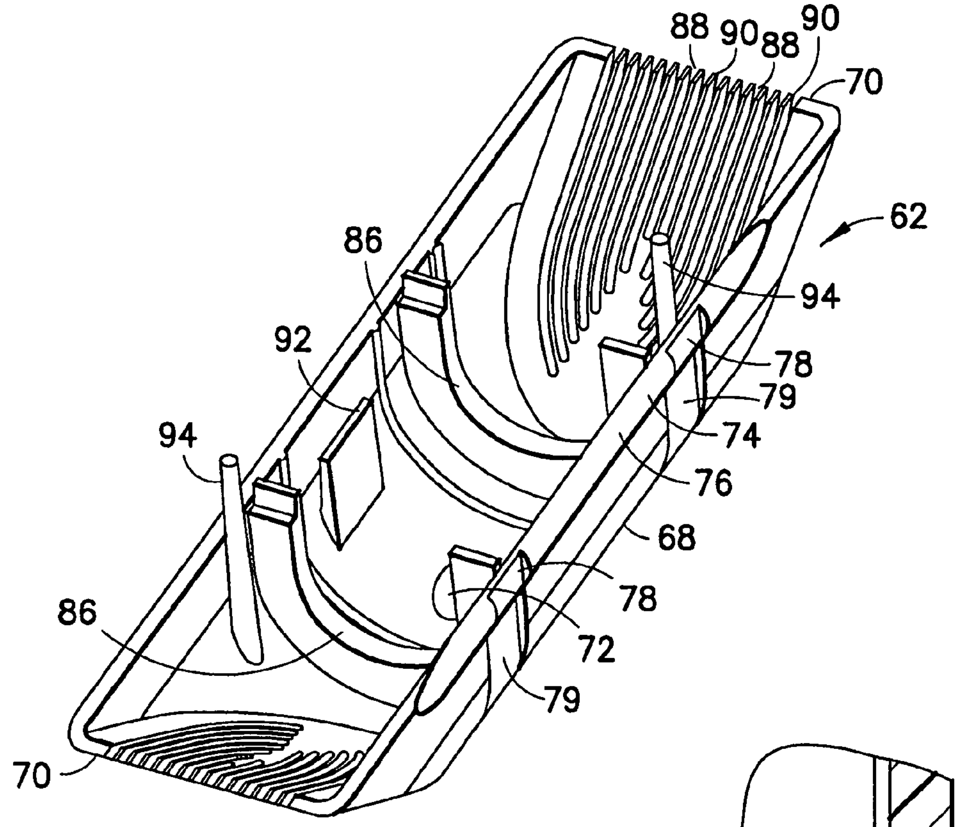
FIG. 6 is a perspective view of one of the cover members of the cover shown in FIG. 5.
Figure 11:
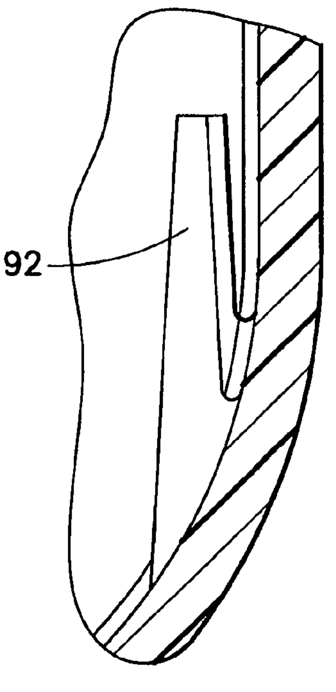
FIG. 11 is an enlarged view of area A shown in FIG. 10.
Figure 10:
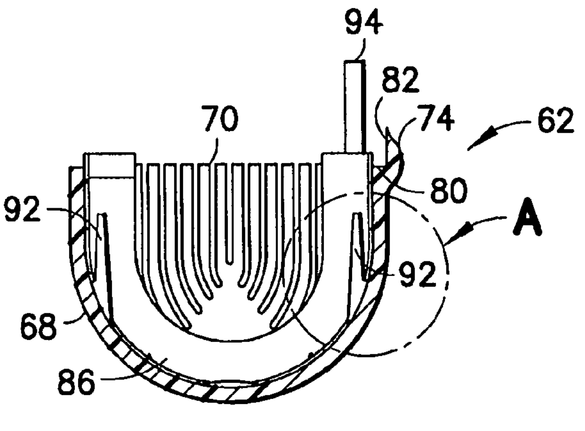
FIG. 10 is an a cross sectional view of the cover member shown in FIG. 7 taken along line 10-10.
Figure 7:
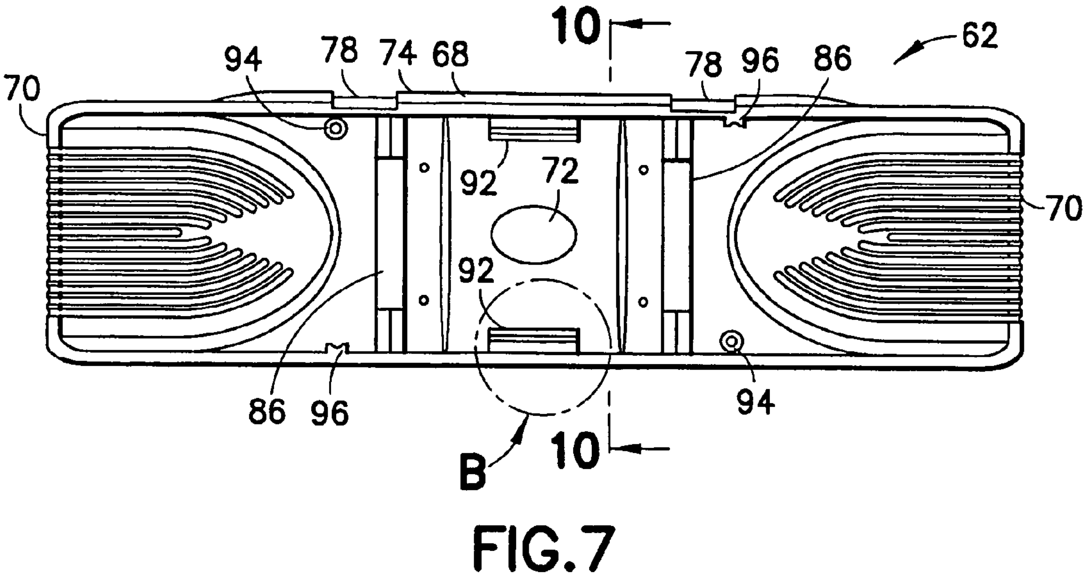
FIG. 7 is a plan top view of the cover member shown in FIG. 6.
Figure 8:
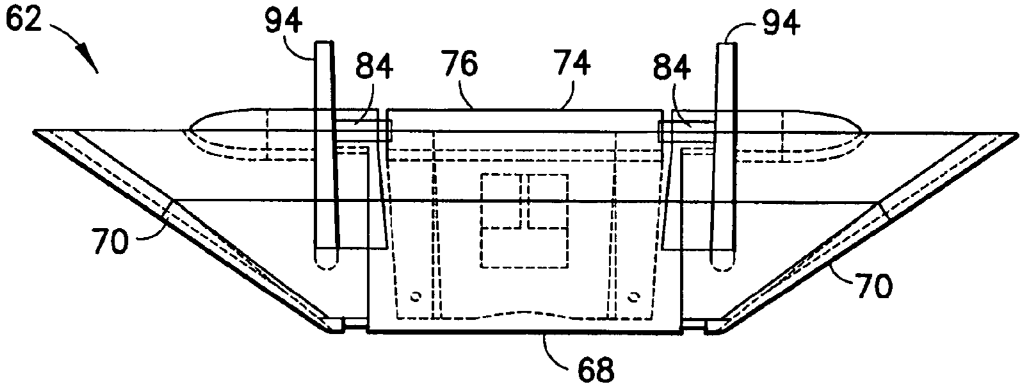
FIG. 8 is an elevational side view of the cover member shown in FIG. 7.
Figure 9:
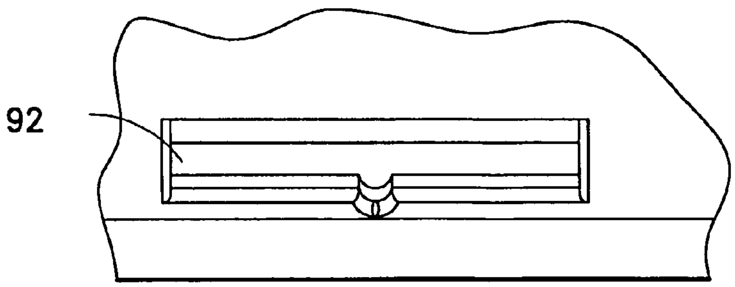
FIG. 9 is an enlarged view of the area B shown in FIG. 7.

The cover 10 is used to cover the connector 18 and the connection of the conductors 14, 16 to each other by the connector 18. Referring also to FIGS. 2-4, the cover 10 generally comprises a main housing section 20 and two end sections 22. In this embodiment the cover 10 comprises two members 24, 26. The two members are identical to each other and each forms a half member of the cover. However, in alternate embodiments more or less than two members could be provided, and the members might not be identical to each other. For example, one member could be provided with two sections connected to each other by a living hinge.

Each member 24, 26 is preferably a one-piece member comprised of a molded plastic or polymer material, such as polycarbonate material for example. However, one or both of the members 24, 26 could be comprised of multiple members. The material, such as polycarbonate material, is preferably transparent. Alternatively, one or more of the members 24, 26 could be comprised of multiple materials, such as different materials at different sections. Each member 24, 26 generally comprises a partially tubular section 28 and end sections 30 at opposite ends of the partially tubular section. The partially tubular section 28 forms half of a tube shaped structure of the main housing section 20. The end sections 30 combine to form the two end sections 22 when the members 24, 26 are mated to each other.

Integrally formed with the partially tubular section 28 is a magnifier window section 32. However, in an alternate embodiment the magnifier window section could be a separate member connected to the rest of the member 24, 26. The magnifier window section 32 forms a lens for allowing a user to view a magnified image of a marking located under the magnifier window section 32 as further described below. Because the member 24, 26 is preferably formed from transparent material, the magnifier window section 32 can be automatically formed when the member 24, 26 is molded. The molded-in magnifying lens allows a user to see a magnified view of a connector inside the cover. For example, a die index, crimp integrity, temperature sensing indicator, or another important issue can be seen with greater clarity.

A first lateral side of the partially tubular section comprises a semi-vessel section 34 with semi-dome shaped opposite ends and a semi-column middle section 36. The middle section 36 includes two recess sections 38 and two recess sections 39 are also provided on the main housing section 20. The semi-vessel section 34 extends past a mating edge 40 of the lateral side of the partially tubular section 28. The inner sides of the middle section 36 comprise snap-lock latch projections 42. The exterior surface of the opposite lateral side of the partially tubular section 28 comprises snap-lock recesses 44. When the two members 24, 26 are connected to each other they are snap-lock connected to each other by the projections 42 and recesses 44. However, in alternate embodiments, any suitable type of primary connection system could be provided. The male and female locking snaps can click together in this two-piece, duplicate mating design. Outside of the snaps, the entire cover surfaces are blended together in a low profile with a substantial radii, in order to prevent them from catching on equipment if the conductor/connector/cover assembly is being pulled or moved from location to location.

The recess sections 38 at the lateral sides of the main housing section 20 and recess sections 39 provide areas where ties (not shown) such as a VELCRO® (hook and loop) cable tie wax cord or a standard plastic cable tie around the circumference of the cover (in up to two places in the embodiment shown), providing a redundant closure mechanism while allowing the cable tie a positive stop location (in the recess sections 38), preventing accidental slippage of the ties from the surface of the cover. Further, the recess sections or grooves 38 prevent the cable ties from significantly bulging outside the surface of the cover, which would be detrimental to the benefit gained by its tubular, submarine shape design of cover 10.

Inside the partially tubular section 28 ribs 46 are provided. The ribs 46 are sized and shaped to interlock with the ribs on the opposite member 24 or 26 to longitudinally interlock the members 24, 26 together. This prevents longitudinal sliding of the members 24, 26 relative to each other. The ribs also add structural rigidity to the semi-tubular shape of the section 28. The ribs form retention legs which funnel the cover pieces together (side-to-side) so that the snap components 42, 44 line up prior to closing, preventing misalignment. Further, they prevent the cover from sliding from side-to-side by resulting in contact with the connector body if it is excessively displaced by some outside force.

Each of the end sections 30 comprise deflectable fingers 48. The fingers 48 are separated by grooves 50. In the embodiment shown some of the grooves 50 have different lengths. Thus, some of the fingers 48 have different lengths. In the embodiment shown, the middle groove is the shortest and the outer grooves are the longest. In addition, the fingers and grooves have straight bottoms, but inwardly curved tops (except for the middle groove). This forms a shape similar to a menorah. The menorah shape of the fingers allow for greater control of finger positions with respect to conductors 14, 16 which they contact. This also minimizes stresses on the fingers with large size and thickness conductors. Also, the finger edges or bottoms are preferably radiused in order to prevent them from poking into the conductor insulation.

The invention has been developed to provide solutions for the problems noted above in the background of the invention section.

The development of a molded-in magnifying lens on the surface of the cover allows the user to have a 'close up' view of the die index and the connection. This makes it substantially easier to see the key information that is desirable when inspecting a covered connector. Polycarbonate has long been used for lenses, lights, and the like. The invention allows this material to be used in a magnifying application that provides the user with an easy to inspect crimped die index without having to get substantially close to the surface of the cover in order to read the index.

The development of specially designed 'conductor fingers' has also been integrated into the design of the cover. This design results in a substantial increase in the number of separate 'fingers' that settle over the bulge of run and tap conductors when the cover is closed around the crimped connection. These fingers act as barriers to prevent entry of small tools, fingers, conductors, and the like. The 'menorah' shape design of these fingers results in two primary benefits over existing designs, whether polycarbonate or HPDE/PP. The smaller fingers result in lower stresses at their bases, therefore better resisting plastic deformations. In addition, the fingers create more complete contact between the conductor(s) and fingers, resulting in less gaps through which small conductors or tools (e.g. screwdrivers) could slip through. Further, these fingers, having less built-in stress, apply substantially less resultant force to the conductor insulation over which they reside, preventing the insulation from being damaged and resulting in a safer overall design. Polycarbonate material can be stiffer and more brittle than polypropylene and polyethylene used in the past. Thus, fingers made with polycarbonate material are stiffer than fingers made with polypropylene and polyethylene. The invention, with the unique design of the fingers and grooves, adjusts for this stiffer material. Thus, fingers can now be used with a clear cover which was not practical before; because polycarbonate could be too stiff and brittle for conventional finger shapes.

The design of the connector cover is substantially 'tubular', with very generous radii on the external surfaces of the cover. This includes both the top and bottom portions of the cover, as well as radial surfaces which contain the latch mechanism and latch catch. The result is an extremely smooth outer surface that will glide over equipment, troughs, and cable trays with much more ease than currently available solutions.

The development of receptacle grooves on both sides of the cover will allow the user to install either a VELCRO® (hook and loop) cable tie wax cord or a standard plastic cable tie around the circumference of the cover (in up to two places in the embodiment shown), providing a redundant closure mechanism while allowing the cable tie a positive stop location, preventing its accidental slippage from the surface of the cover. Further, the grooves prevent the cable tie from bulging outside the surface of the cover, which would be detrimental to the benefit gained by its tubular, 'submarine' design.

Referring to FIGS. 5-11 an alternate embodiment of the invention is shown. In this embodiment the cover 60 comprises two cover members 62. The two cover members 62 are identical to each other and attached to each other in reversed, mirrored or flipped positions. The two members are identical to each other and each forms a half member of the cover. However, in alternate embodiments more or less than two members could be provided, and the members might not be identical to each other. For example, one member could be provided with two sections connected to each other by a living hinge.

The cover 60 is used to cover the connector 18 (see FIG. 1) and the connection of the conductors 14, 16 to each other by the connector 18 (see FIG. 1). The cover 60 generally comprises a main housing section 64 and two opposite end sections 66. Each member 62 is preferably a one-piece member comprised of a molded plastic or polymer material, such as polycarbonate material for example. However, one or both of the members 62 could be comprised of multiple members. The material, such as polycarbonate material, is preferably transparent. Alternatively, one or more of the members 62 could be comprised of multiple materials, such as different materials at different sections. Each member 62 generally comprises a partially tubular section 68 and end sections 70 at opposite ends of the partially tubular section. The partially tubular section 68 forms half of a tube shaped structure of the main housing section 64. The end sections 70 combine to form the two end sections 66 when the members 62 are mated to each other.

Integrally formed with the partially tubular section 68 is a magnifier window section 72. However, in an alternate embodiment the magnifier window section could be a separate member connected to the rest of the member 62. Alternatively, a magnifier section might not be provided. The magnifier window section 72 forms a lens for allowing a user to view a magnified image of a marking located under the magnifier window section 72 as further described below. Because the member 62 is preferably formed from transparent material, the magnifier window section 72 can be automatically formed when the member 62 is molded. The molded-in magnifying lens allows a user to see a magnified view of a connector inside the cover. For example, a die index, crimp integrity, temperature sensing indicator, or another important issue can be seen with greater clarity.

A first lateral side of the partially tubular section comprises a semi-vessel section 74 with semi-dome shaped opposite ends and a semi-column middle section 76. The middle section 76 includes two recess sections 78 and two recesses 79 are provided on the main housing section. The semi-vessel section 74 extends past a mating edge 80 of the lateral side of the partially tubular section 68. The inner sides of the middle section 76 comprise snap-lock latch projections 82. The exterior surface of the opposite lateral side of the partially tubular section 68 comprises snap-lock recesses 84. When the two members 62 are connected to each other they are snap-lock connected to each other by the projections 82 and recesses 84. However, in alternate embodiments, any suitable type of primary connection system could be provided. The male and female locking snaps can click together in this two-piece, duplicate mating design. Outside of the snaps, the entire cover surfaces are blended together in a low profile with a substantial radii, in order to prevent them from catching on equipment if the conductor/connector/cover assembly is being pulled or moved from location to location.

The recess sections 78 at the lateral sides of the main housing section 64 and the recess sections 79 provide areas where ties (not shown) such as a VELCRO® (hook and loop) cable tie wax cord or a standard plastic cable tie around the circumference of the cover (in up to two places in the embodiment shown), providing a redundant closure mechanism while allowing the cable tie a positive stop location (in the recess sections 78), preventing accidental slippage of the ties from the surface of the cover. Further, the recess sections or grooves 78 prevent the cable ties from significantly bulging outside the surface of the cover, which would be detrimental to the benefit gained by its tubular, submarine shape design of cover 60.

Inside the partially tubular section 68 ribs 86 are provided. The ribs 86 are sized and shaped to interlock with the ribs on the opposite member 62 to longitudinally interlock the members 62 together. This prevents longitudinal sliding of the members 62 relative to each other. The ribs also add structural rigidity to the semi-tubular shape of the section 64. The ribs form retention legs which funnel the cover pieces together (side-to-side) so that the snap components 82, 84 line up prior to closing, preventing misalignment. Further, they prevent the cover from sliding from side-to-side by resulting in contact with the connector body if it is excessively displaced by some outside force.

Each of the end sections 70 comprise deflectable fingers 88. The fingers 88 are separated by grooves 90. In the embodiment shown some of the grooves 90 have different lengths. Thus, some of the fingers 88 have different lengths. In the embodiment shown, the middle groove is the shortest and the outer grooves are the longest. In addition, the fingers and grooves have straight bottoms, but inwardly curved tops (except for the middle groove). This forms a shape similar to a menorah. The menorah shape of the fingers allow for greater control of finger positions with respect to conductors 14, 16 which they contact. This also minimizes stresses on the fingers with large size and thickness conductors. Also, the finger edges or bottoms are preferably radiused in order to prevent them from poking into the conductor insulation.

In this embodiment each cover member 62 further comprises two projections 92 and two posts 94. The projections 92 comprise cantilevered projections on opposite sides of the magnifier window section 72. The projections 92 are resiliently deflectable to form shock absorbers for the connector 18 positioned inside the cover 60. In alternate embodiments, other sizes or shapes of portions of the cover members 62 could be provided to form shock absorbers for the connector. The posts 94 extend into mating slots 96 in the opposite cover member 62 when the two cover members are assembled to each other. With this alternate embodiment, the addition of shock absorbers protect the interior walls of the cover from movement of the connector inside the cover. In addition, the two pencil-shaped alignment posts extend from inside each cover half to aid in aligning the cover members to each other during assembly. In alternate embodiments, any suitable alignment system could be provided. One feature of any connector cover is positioning of the connector within the cover. Functionally, the absorbers have some relation to holding the connector in position, but can also resiliently deflect.

Additional positioning, such as with an additional "gel" is an alternate method to the installation. The cover of the invention can be used without additional gel. Since the cover and gel are separate entities, and the material that the feature is made is not polycarbonate, use of the cover of the invention without gel could be a better method since two steps are unnecessary.

The "shock absorbers" of the second embodiment provide side bars for positioning "side-to-side" on the lateral sides of the connector. This is in addition to the longitudinal positioning barriers (internal arcs 86) for the connector.

Referring also to FIGS. 12-15 perspective views of cover members of alternate cover embodiments are shown. The embodiments comprises rib-post and hole features which form shell supports within the covers acting as structural ribs for strength. The main features of the support rib is the included post and hole feature to assist with aligning the halves together during installation, and improved impact strength integrity. The rib also sports a high and low protrusion condition so that when both halves come together, the rib from one half interlocks with the other and visa versa. This unique design facilitates initial performance testing as well as field strength against many forms of impacts, thus, avoiding dielectric shock and brush contact with the connection enclosed by the cover.

Figure 12:
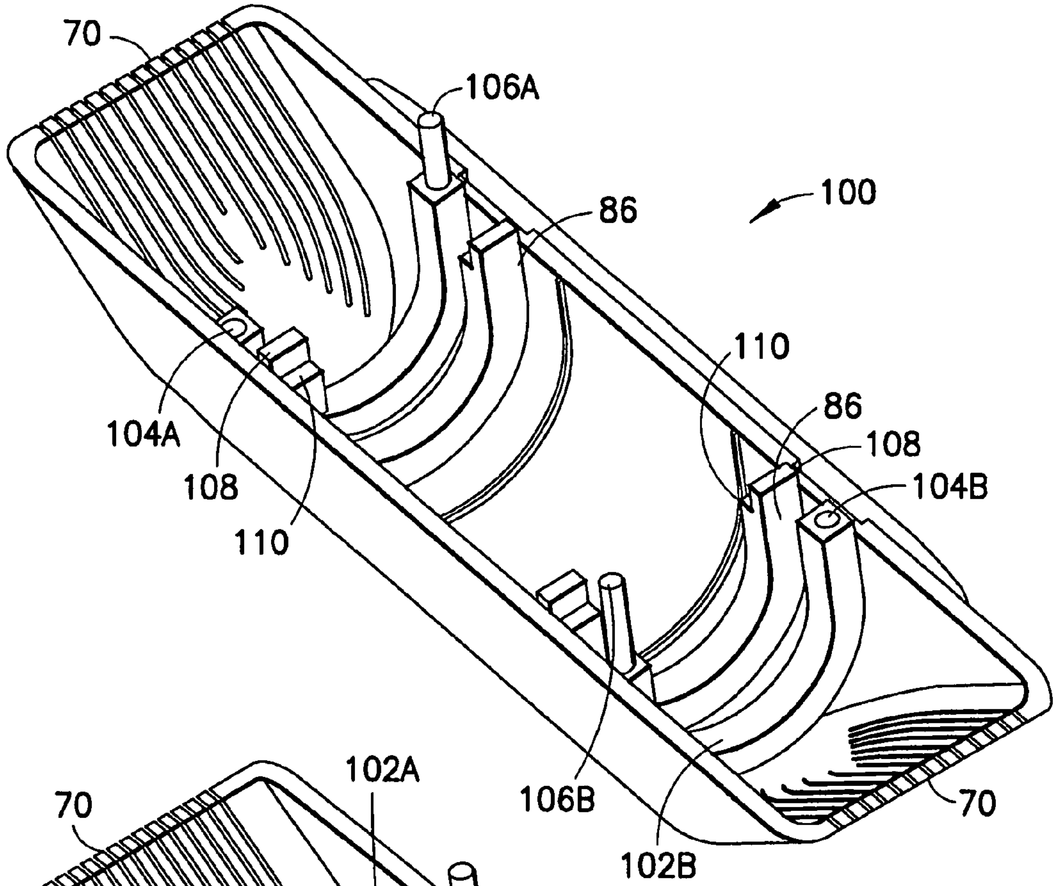
FIG. 12 is a perspective view of one of the cover members of an alternate embodiment of the invention.

In the embodiment shown in FIG. 12 the cover member 100 has the ribs 86, but no projections 92. The ribs 86 have high and low protrusions 108, 110 at both opposite ends. Interposed between the ribs 86 and their respective end sections 70 are ribs 102A, 102B. Opposite ends of each rib 102A, 102B has a hole 104A, 104B and a post 106A, 106B, respectively. The posts 106A, 106B have different heights because the ends of the ribs 102A, 102B have different heights.

Figure 13:
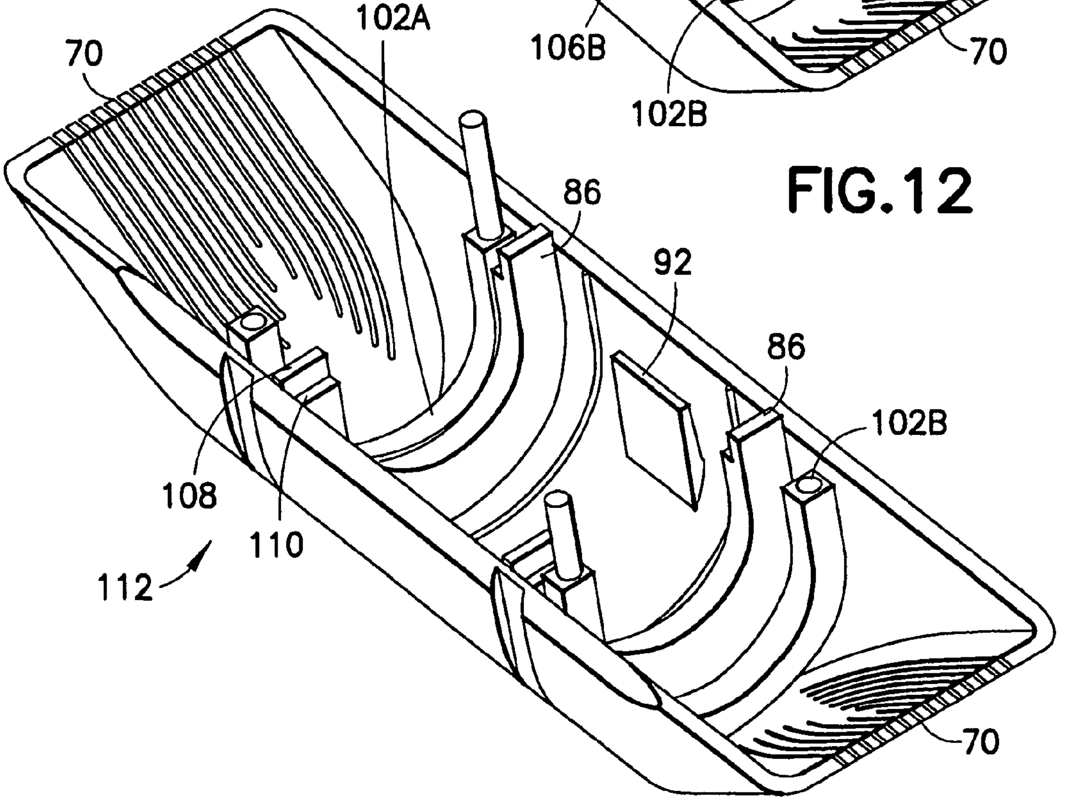
FIG. 13 is a perspective view of one of the cover members of another alternate embodiment of the invention.

In the embodiment shown in FIG. 13 the cover member 112 has the ribs 86, and projections 92. The ribs 86 have high and low protrusions 108, 110 at both opposite ends. Interposed between the ribs 86 and their respective end sections 70 are ribs 102A, 102B. The ribs 102A, 102B have different spacings from their respective ribs 86.

Figure 14:
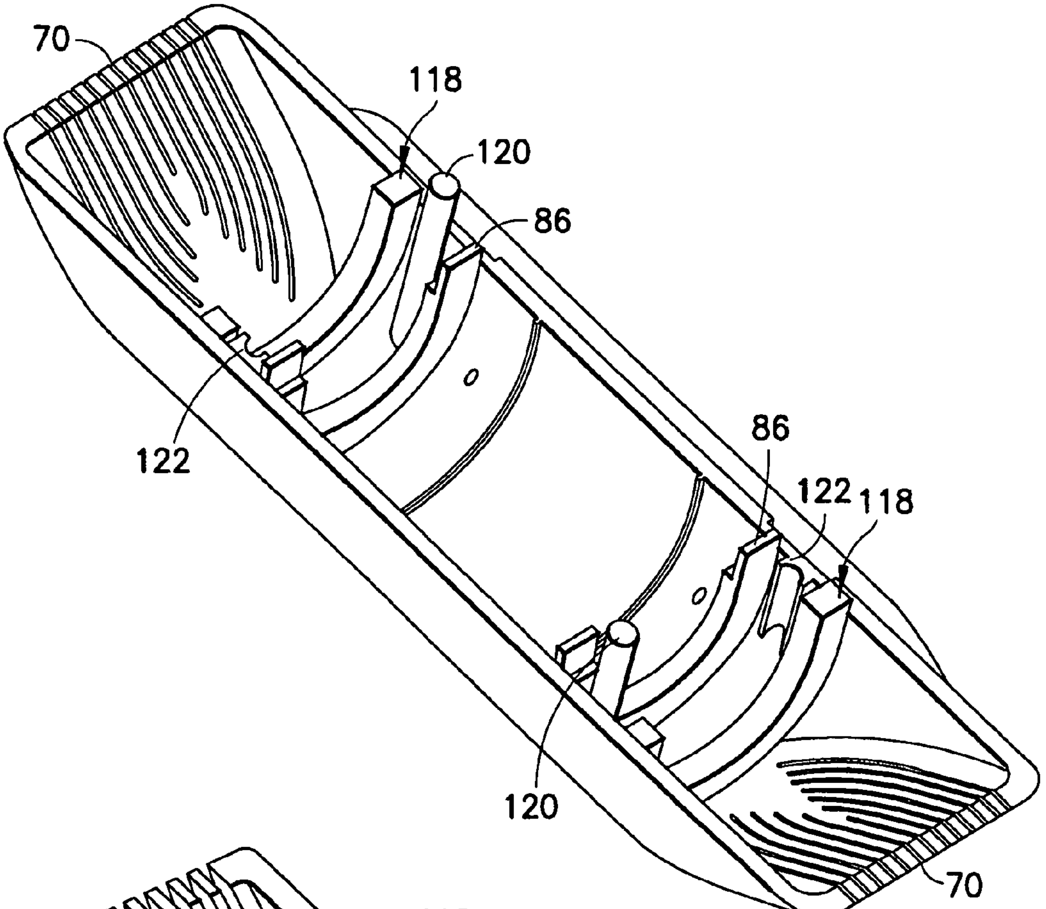
FIG. 14 is a perspective view of one of the cover members of an alternate embodiment of the invention.

In the embodiment shown in FIG. 14 the cover member 116 has the ribs 86, but no projections 92. Interposed between the ribs 86 and their respective end sections 70 are ribs 118. Opposite ends of each rib 118 are flat and do not contain a post or hole. Posts 120 are interposed between each pair of ribs 86, 118. The interior sides of the cover member 116 also has slots 122 between each pair of ribs 86, 118 for receiving the posts 120.

Figure 15:
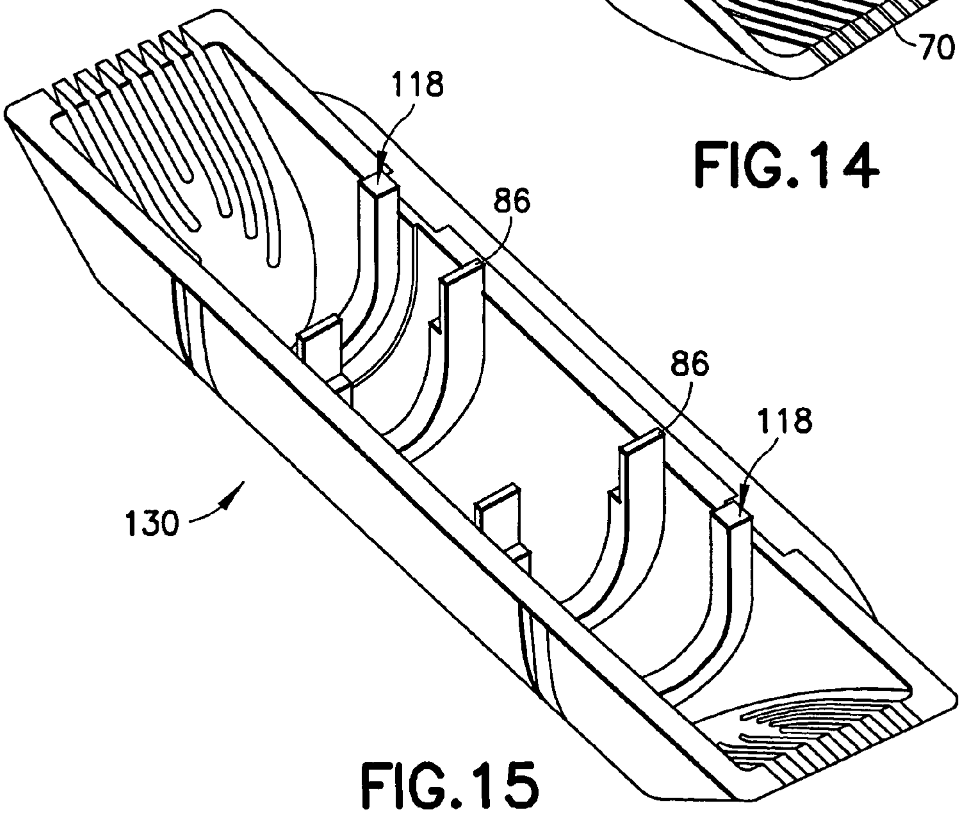
FIG. 15 is a perspective view of one of the cover members of an alternate embodiment of the invention.

In the embodiment shown in FIG. 15 the cover member 130 is similar to the cover member 116 shown in FIG. 14, but is thinner. The cover member 130 does not have the posts 120 or slots 122. Instead, merely the pairs of ribs 86 and ribs 118 are provided.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An electrical connector and conductor assembly cover comprising:

a main housing section forming a connector receiving area, wherein the connector receiving area is sized and shaped to house an electrical connector therein; and a magnifying window section in the main housing section, wherein the magnifying window section is located between the connector receiving area and an exterior of the cover such that a user can view a magnified image of a marking on the electrical connector in the connector receiving area from the exterior of the cover without opening the main housing section, wherein the cover comprises a first end section at an end of the main housing section, wherein the first end section comprises a plurality of deflectable fingers forming an entrance into the connector receiving area through the first end section, wherein a plurality of grooves are provided between the fingers, and wherein the grooves have different lengths.

2. An electrical connector and conductor assembly cover as in claim 1 wherein a middle groove of the grooves in a middle area of the fingers is shorter than an outer groove of the grooves proximate an outer side area of the fingers.

3. An electrical connector and conductor assembly cover comprising:

a main housing section forming a connector receiving area, wherein the connector receiving area is sized and shaped to house an electrical connector therein; and a magnifying window section in the main housing section, wherein the magnifying window section is located between the connector receiving area and an exterior of the cover, wherein the magnifying window section is configured to magnify a marking on the electrical connector in the connector receiving area for viewing at the exterior of the cover without opening the main housing section, wherein the main housing section comprises:

a first housing member comprising a first partially tubular section and end sections at opposite ends of the first partially tubular section, wherein the first partially tubular section comprises a first side section with a recess along an exterior side of the first side section; and a second housing member comprising a second partially tubular section and end sections at opposite ends of the second partially tubular section, wherein the second partially tubular section comprises a second side section with a recess along an exterior side of the second side section, wherein the first and second housing members are sized and shaped to be connected to each other to form a generally tubular shape with the recesses of the first and second side sections being located at opposite exterior sides of the generally tubular section.

4. An electrical connector and conductor assembly cover comprising: a main housing section forming a connector receiving area, wherein the connector receiving area is sized and shaped to house an electrical connector therein; a magnifying window section in the main housing section, wherein the magnifying window section is located between the connector receiving area and an exterior of the cover, wherein the magnifying window section is configured to magnify a marking on the electrical connector in the connector receiving area for viewing at the exterior of the cover without opening the main housing section; and an integral connector resilient shock absorber which is integrally formed with the main housing section.

5. An electrical connector and conductor assembly cover as in claim 4 wherein the shock absorber comprises two cantilevered projections adapted to be located on lateral sides of the electrical connector.

6. An electrical connector and conductor assembly cover comprising:

a main housing section forming a connector receiving area, wherein the connector receiving area is sized and shaped to house an electrical connector therein; and a first end section at a first end of the main housing section, wherein the first end section comprises a plurality of deflectable fingers forming an entrance into the connector receiving area through the first end section, wherein a plurality of grooves are provided between the fingers, and wherein the grooves have different lengths.

7. An electrical connector and conductor assembly cover as in claim 6 wherein a middle groove of the grooves in a middle area of the fingers is shorter than an outer groove of the grooves proximate an outer side area of the fingers.

8. An electrical connector and conductor assembly cover as in claim 6 wherein the main housing section comprises an integrally formed magnifying window section, wherein the magnifying window section is located between the connector receiving area and an exterior of the cover such that a user can view a magnified image of a marking on the electrical connector in the connector receiving area from the exterior of the cover without opening the main housing section.

9. An electrical connector and conductor assembly cover as in claim 6 wherein the main housing section comprises a transparent polymer material.

10. An electrical connector and conductor assembly cover as in claim 9 wherein the transparent polymer material comprises polycarbonate material.

11. An electrical connector and conductor assembly cover as in claim 6 wherein the main housing section comprises two mating half members.

12. An electrical connector and conductor assembly cover as in claim 11 wherein the mating half members are adapted to be snap-lock connected to each other to form the connector receiving area therebetween.

13. An electrical connector and conductor assembly cover as in claim 6 further comprising an integral connector shock absorber section which is integrally formed with the main housing section.

14. An electrical connector and conductor assembly cover as in claim 13 wherein the shock absorber section comprises two cantilevered projections adapted to be located on lateral sides of the electrical connector.

15. An electrical connector and conductor assembly cover as in claim 6 the main housing comprises two cover members which are connected to each other, and each housing member comprising alignment posts which mate with slots in the opposing cover member.

16. An electrical connector and conductor assembly cover comprising:

a first housing member comprising a first partially tubular section and end sections at opposite ends of the first partially tubular section, wherein the first partially tubular section comprises a first side section with a recess along an exterior side of the first side section; and a second housing member comprising a second partially tubular section and end sections at opposite ends of the second partially tubular section, wherein the second partially tubular section comprises a second side section with a recess along an exterior side of the second side section, wherein the first and second housing members are sized and shaped to be connected to each other to form a generally tubular shape with the recesses of the first and second side sections being located at opposite exterior sides of the generally tubular section, wherein the end sections of the first and second housing members comprise a plurality of deflectable fingers forming entrances into a connector receiving area formed by the first and second housing members, wherein a plurality of grooves are provided between the fingers, and wherein the grooves have different lengths.

17. An electrical connector and conductor assembly cover as in claim 16 wherein a middle groove of the grooves in a middle area of the fingers is shorter than another groove of the grooves proximate an outer side area of the fingers.

18. An electrical connector and conductor assembly cover comprising:

a first housing member comprising a first partially tubular section and end sections at opposite ends of the first partially tubular section, wherein the first partially tubular section comprises a first side section with a recess along an exterior side of the first side section; and a second housing member comprising a second partially tubular section and end sections at opposite ends of the second partially tubular section, wherein the second partially tubular section comprises a second side section with a recess along an exterior side of the second side section, wherein the first and second housing members are sized and shaped to be connected to each other to form a generally tubular shape with the recesses of the first and second side sections being located at opposite exterior sides of the generally tubular section, wherein the first and second housing members each comprise an integral, resiliently deflectable connector shock absorber section.

19. An electrical connector and conductor assembly cover as in claim 18 wherein the shock absorber section comprises two cantilevered projections adapted to be located on lateral sides of an electrical connector.

* * * * *